United States Patent [19]

Rammler

[11] 4,040,958

[45] Aug. 9, 1977

[54] PROCESS FOR SEPARATING SOLIDS FROM HIGH-BOILING HYDROCARBONS IN A PLURALITY OF SEPARATION STAGES

[75] Inventor: Roland Rammler, Konigstein, Germany

[73] Assignee: Metallgesellschaft Aktiengesellschaft, Frankfurt am Main, Germany

[21] Appl. No.: 652,589

[22] Filed: Jan. 26, 1976

[30] Foreign Application Priority Data

Feb. 4, 1975 Germany .............................. 2504488

[51] Int. Cl.² ...................... B01D 21/00; B01D 21/26
[52] U.S. Cl. .................................................. 210/73 R
[58] Field of Search .............. 208/177, 188; 210/73 R

[56] References Cited

U.S. PATENT DOCUMENTS

| | | | |
|---|---|---|---|
| 2,235,639 | 3/1941 | Koch | 208/188 |
| 2,914,518 | 11/1959 | Cottle | 210/73 R |
| 3,396,100 | 8/1968 | Pettefer | 208/177 |
| 3,468,789 | 9/1969 | Balassa | 208/188 |
| 3,684,699 | 8/1972 | Vermeulen et al. | 208/188 |
| 3,696,021 | 10/1972 | Cole et al. | 208/188 |
| 3,878,090 | 4/1975 | Redford | 208/188 |
| 3,900,389 | 8/1975 | Baillie | 208/188 |
| 3,974,073 | 8/1976 | Sze et al. | 210/73 R |

*Primary Examiner*—George Crasanakis
*Attorney, Agent, or Firm*—Burgess, Dinklage & Sprung

[57] ABSTRACT

Solids are separated from solids-containing, high-boiling hydrocarbons by mixing a lower-boiling liquid diluent with the solids-containing, high-boiling hydrocarbons, clarifying the mixture to separate same into a solid-enriched phase and a low-solids liquid phase, separating the high-boiling hydrocarbons from the low-solids phase by distillation, and recovering and reusing the diluent. The high-boiling hydrocarbons can be heavy oil or heavy tar from the thermal treatment of hard coal, brown coal, tar sands, oil shale or the like.

8 Claims, 3 Drawing Figures

PROCESS FOR SEPARATING SOLIDS FROM HIGH-BOILING HYDROCARBONS IN A PLURALITY OF SEPARATION STAGES

BACKGROUND

This invention relates to a process for separating solids from dust-containing high-boiling hydrocarbons.

The thermal treatment of bituminous or oil-containing materials, such as hard coal, brown coal, tar sands, oil shale or the like involves a condensation of the hydrocarbon-containing products with formation of a dust-enriched high-boiling fraction. Similar products result from the thermal or catalytic cracking of hydrocarbons. Dust-enriched tar becomes available also in the pressure gasification of coal.

German Pat. No. 1,909,263 discloses a dry distillation process in which dust-enriched heavy oil is diluted and then filtered so that the liquid phase is separated as completely as possible from the solids. The filtered liquid phase is then separated by distillation into heavy oil and diluent, and the latter is re-used. To dry the filter cake, the same is mixed with hot dry distillation residue and is thus heated. As a result, residual diluent is evaporated. The evaporated diluent is condensed and also returned into the separating process. This single-stage process is relatively expensive, particularly when the heavy oil has a high dust content and when high throughput rates are desired.

SUMMARY

This invention makes it possilbe to separate the solids as economically as possible from dust-containing high-boiling hydrocarbons formed at high rates and have a relatively high dust content. This is accomplished according to the invention in that a lower-boiling liquid diluent is admixed to the dust-containing high-boiling hydrocarbons, the mixture is clarified to separate it into a solids-enriched phase and a low-solids liquid phase, the high-boiling hydrocarbons are separated by distillation from the low-solids phase, and the diluent is recovered and re-used. The term "clarifying" relates to a separating process, such as sedimentation in one or more settling basins, centrifuging or filtering. When reference is made hereinafter to a phase "free from solids" this will include also liquids which have a solids content that is so low that it is not disturbing.

The diluent consists suitably of a liquid in which the high-boiling hydrocarbons are dissolved. For instance, medium oil, light oil, gasoline or mixture of these liquids may be used for this purpose; these mixtures often become available in the gasifying process itself. The diluent should have a lower specific gravity than the high-boiling hydrocarbons.

According to a preferred feature of the invention, the separation is effected in at least two separating stages, each of which comprises a mixer and also a settling basin, centrifuge or filter. The untreated dust-containing hydrocarbons are fed to the first separating stage and mixed with a diluent which already contains high-boiling hydrocarbons free from solids. The last separating stage contains high-boiling hydrocarbons which have been separated from the solids to a high degree and is fed with recirculated diluent which has only a low or zero content of high-boiling hydrocarbons. Part of this recirculated diluent may be fed to preceding separating stages. The liquid-containing solids withdrawn from the last separating stage are dried so that residual diluent is stripped off. This diluent is also re-used in the process.

DESCRIPTION OF THE DRAWING

Alternate embodiments for the separating process will be explained with reference to the drawing, in which.

DESCRIPTION

Figure 1:
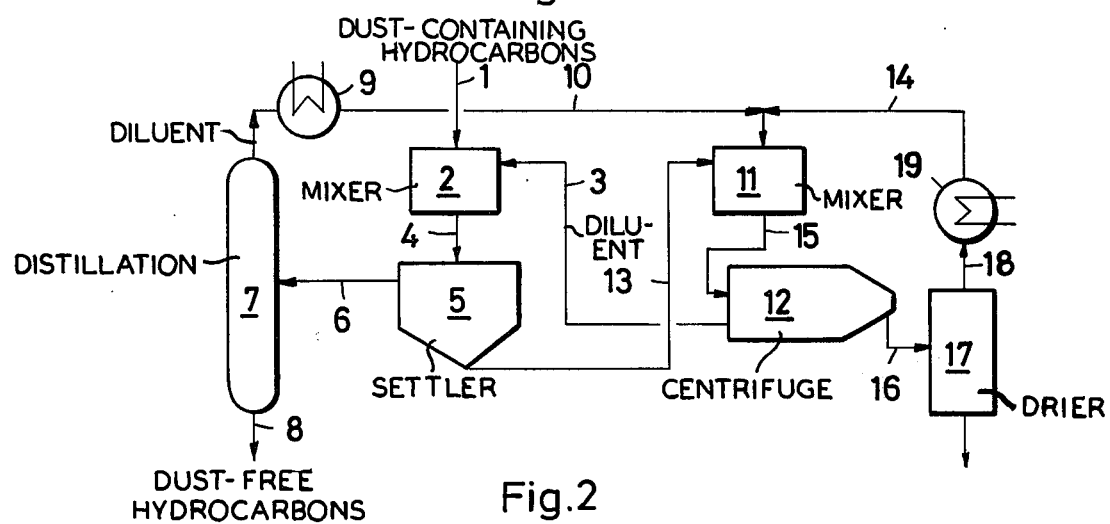
FIG. 1 shows a flow diagram of one embodiment of the process having two separating stages.

Dust-containing high-boiling hydrocarbons having an initial boiling point above about 80° C, preferably of about 100° C, and solids content of about 5–70% by weight, preferably 20–60% by weight, are fed through conduit 1 to a mixer 2 of a first separating stage and are mixed in the mixer 2 with diluent from conduit 3. High-boiling hydrocarbons free from solids have been dissolved in said diluent. The mixture is fed through conduit 4 to a settling basin 5, in which the solids settle by gravity. The diluent in which high-boiling hydrocarbons have been dissolved is withdrawn from the upper region of the settling basin 5 as a phase free from solids and is fed through conduit 6 to the distilling means 7.

In the distilling means 7 the lower-boiling diluent is evaporated whereas the high-boiling hydrocarbon remain liquid and are withdrawn through conduit 8. The evaporated diluent is re-liquefied in condenser 9 and is fed through conduit 10 to a second separating stage, which consists of a mixer 11 and a centrifuge 12. A branch stream may be fed from conduit 10 to the mixer 2 of the first separating stage, if required.

The high-solids phase from the settling basin 5 is fed through conduit 13 to the mixer 11. Additional diluent is fed through conduit 14 to mixer 11. The mixture of diluent, solids and high-boiling hydrocarbons flows through conduit 15 to the centrifuge 12, in which liquid and solids are separated. The phase free from solids which has been separated in the centrifuge 12 is recycled in conduit 3 to the first separating stage, which consists of the mixer 2 and the succeeding settling basin 5. The wet solids discharged from the centrifuge 12 are fed through conduit 16 to the dryer 17 and are heated in the latter. Residual diluent which has thus been evaporated is fed through conduit 18 to a condenser 19, in which the diluent is liquefied. The condensed diluent is recycled through conduit 14 to the second separating stage. Alternatively, all or part of this diluent may be fed to the first separating stage.

The expenditure involved in the separation, particularly as regards the quantity of circulating diluent, will mainly depend on the permissible content of residual higher-boiling hydrocarbons in the solids discharged from the last separating stage. When the solids are to be separated with the highest possible purity, i.e., a residual content of high-boiling hydrocarbons below 5% by weight, more diluent must be circulated than in cases in which higher contents of the high-boiling hydrocarbons in the solids are permissible. The efficiency of separation may also be improved by the use of more expensive clarifying means. The viscosities of the crude oil and the diluent must also be taken into account in selecting the diluting ratios.

Figure 2:
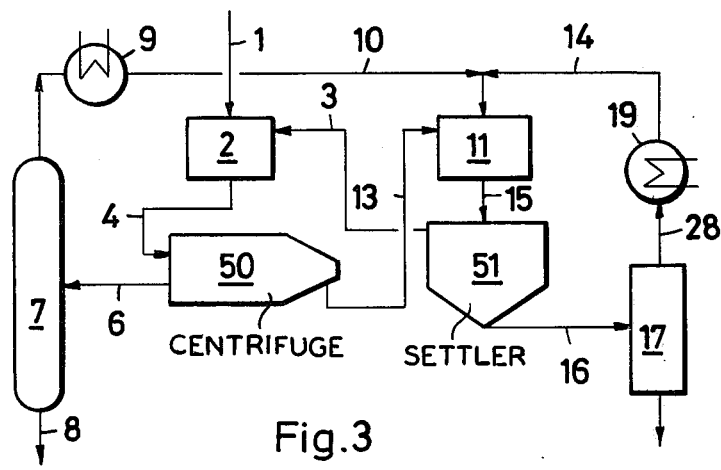
FIG. 2 is a flow diagram of another embodiment of the process having two separating stages and FIG. 3 is a flow diagram of a three-stage separating process.

The flow shown in FIG. 2 differs from that of FIG. 1 in that the first separating stage comprises a centrifuge 50 rather than the settling basin 5 shown in FIG. 1, and a settling basin 51 is used in the second separating stage. In other respects, the process is the same and the explanations given with reference to FIG. 1 are also applicable to FIG. 2. Like parts are designated with the same reference numerals in FIGS. 1 and 2.

Figure 3:
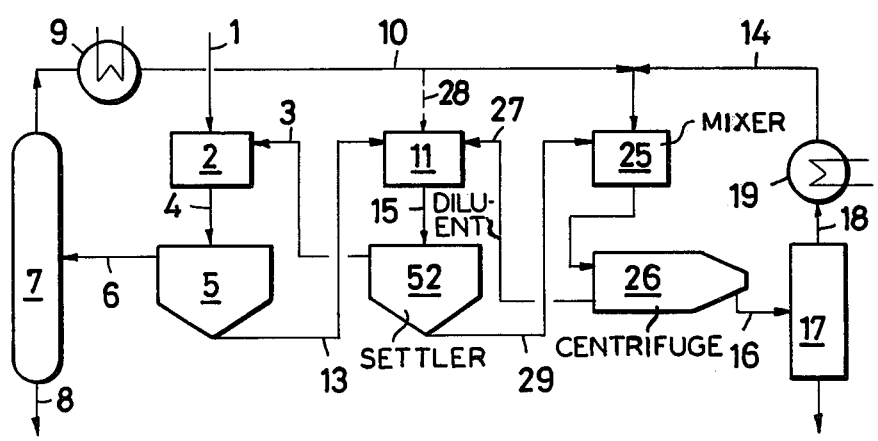

FIG. 3 shows a process of separating solids from dust-containing high-boiling hydrocarbons in three separating stages. The first separating stage consists of the mixer 2 and the settling basin 5 and the second stage of the mixer 11 and a settling basin 52; the third stage comprises a mixer 25 and a centrifuge 26.

The dust-containing high-boiling hydrocarbons to be separated are fed through conduit 1 to mixer 2, which is fed through conduit 3 with diluent which already contains high-boiling hydrocarbons and has been withdrawn from the upper region of the settling basin 52 as a phase free from solids. The high-boiling hydrocarbons are soluble in the diluent so that the phase free from solids which is contained in settling basin 5 contains a major of said hydrocarbons. The phase free from solids is fed through conduit 6 to the distilling means 7 and is separated there in the manner which has been described with reference to FIG. 1.

The high-solids phase from the lower region of the settling basin 5 is fed into the mixer 11 of the second separating stage and is mixed with diluent from conduit 27. Condensed diluent which has been withdrawn from the distilling means 7 and flows in conduit 10 may also be added, if required, through a conduit 28 indicated by dotted lines. A diluent stream branched from the conduit 1o may be fed to the mixer 2 by means not shown.

In the second separating stage, the phase free from solids collects in the upper region of the settling basin 52 and the solids are enriched by sedimentation in the lower region. The phase free from solids is withdrawn through conduit 3 and is fed as a diluent to the first separating stage. The high-solids phase is fed through conduit 29 to the third separating stage, in which diluent from conduits 10 and 14 is added in the mixer 25. In a modification, not shown, all or part of the diluent flowing in conduit 14 is fed to the first and/or second separating stages.

According to FIG. 3 the mixture from the mixer 25 is separated in the centrifuge 26 and the separated wet solids are fed to the dryer 17. The liquid which has been separated in the centrifuge is fed as a diluent through conduit 27 to the second separating stage. The embodiment of the process shown in FIG. 3 may be modified in that the centrifuge 26 is also replaced by a settling basin or one or both settling basins are replaced by centrifuges. A filter may be used instead of a settling basin or a centrifuge, particularly for the last separating stage or one of the last separating stages before the dryer.

More than three separating stages may be provided in an arrangement in which phase free from solids is withdrawn from one separating stage and fed as a diluent to the preceding stage. The phase free from solids which has been withdrawn from the first separating stage is separated in distilling means, and the diluent is recovered and returned to the process. Recovered diluent is particularly added to the last separating stage to remove the high-boiling hydrocarbons as completely as possible from the solids in this stage. In this arrangement the solids and diluent flow countercurrently in each stage.

EXAMPLE 1

In an embodiment as shown in FIG. 1, the mixer 2 is fed with dust-containing crude oil, which consists of 50% by weight of oil and 50% by weight of dust. The crude oil has an initial boiling point of 100° C. Diluent which comes from conduit 3 and consists of 76% gasoline and 24% dissolved crude oil is added to the dust-containing crude oil in a ratio of 1:1 by weight. The mixture is separated in the settling basin 5. The liquid phase fed to the distilling means 7 through conduit 6 consists of equal parts of crude oil and gasoline.

The high-solids phase withdrawn from the settling basin 5 is fed through conduit 13 to the mixer 11 of the second separating stage and is mixed there in a ratio of 2:1 by weight with gasoline from conduits 10 and 14. The solid phase leaving the centrifuge 12 still contains about 30% by weight of liquid, mainly gasoline, which is stripped off in the dryer 17. The dried solid phase still contains about 10% crude oil.

EXAMPLE 2

This example relates to an embodiment as shown in FIG. 2. The same dust-containing crude oil as in Example 1 is used. Diluent which is fed through conduit 3 and consists of 97% gasoline is added in a ratio of 1:2 by weight to the mixture of crude oil and dust. A low-dust liquid phase which contains about 80% gasoline is fed from centrifuge 50 through conduit 6 to the distilling means 7. The high-solids phase flowing in conduit 13 contains about 70% dust and is mixed in the mixer 11 in a ratio of about 1:3 by weight with gasoline from conduits 10 and 14. A solids-containing phase which contains 45% dust and in addition thereto contains mainly gasoline is withdrawn through conduit 16 from the settling basin 51. The gasoline is evaporated in the dryer 17 and is then recovered in the condenser 19 whereas solids containing 2% oil are left. The residual oil content is lower than in Example 1 mainly because more diluent is employed.

The quantity of diluent which is circulated may be selected within wide limits. An economic calculation will quickly tell a person skilled in the art which conditions are most favorable in an individual case.

EXAMPLE 3

The crude oil which is used in Example 1 is subjected to the three stage separating process shown in FIG. 3. For this purpose it is mixed in the mixer 2 with diluent from conduit 3 in a ratio of 1:1 by weight. A liquid phase which is virtually free from dust and consists of equal parts of crude oil and gasoline is withdrawn from the settling basin 5 and is separated in the distilling means 7. The high-solids phase is fed through conduit 13 to the second separating stage and is mixed in the mixer 11 thereof with diluent from conduit 27. The mixing ratio of the high-solids phase from conduit 13 and diluent from conduit 27 is about 1.1:1. An almost dust-free mixture which consists of 32% crude oil and 68% gasoline is withdrawn from the settling basin 52 and is fed through conduit 3 to the first separating stage.

The high-solids phase which has been withdrawn from the second separating stage through conduit 29 is mixed in the mixer 25 of the third separating stage with gasoline in a mixing ratio of about 1:0.6. A substantially dust-free liquid which contains 84% gasoline is withdrawn from the centrifuge 26 and is fed through conduit 27 to the second separating stage. A high-solids phase which contains about 70% by weight of dust is withdrawn from the centrifuge and when this phase has been dried and the gasoline has been stripped therefrom the high-solids phase still contains about 6% by weight of crude oil.

What is claimed is:

1. Process of separating solids from solids-containing, high-boiling hydrocarbons in two or more separation stages, each separation stage comprising a mixing zone and downstream from said mixing zone a separation zone, said process comprising (a) withdrawing from each separation zone a low-solids liquid phase and a solids-enriched phase and feeding said solids-enriched phase from each separation zone to the mixing zone of the following stage; (a) feeding said solids-containing, high-boiling hydrocarbons together with a low-boiling liquid hydrocarbon diluent and the low-solids liquid phase withdrawn from the separation zone of the second separation stage to the mixing zone of the first separation stage, said diluent containing at least one component selected from the group consisting of medium oil, light oil or gasoline, (c) feeding the low-solids liquid phase from said first separation stage to a distillation zone and recovering said low-boiling diluent therefrom, (d) feeding the low-solids liquid phase of each stage following said first stage to the mixing zone of the preceding stage and (e) recovering solids-free, high-boiling hydrocarbons from said distillation zone.

2. Process of claim 1 wherein the high-boiling hydrocarbons are dissolved in said liquid diluent.

3. Process of claim 1 wherein the high-boiling hydrocarbons are heavy oil or heavy tar from the thermal treatment of hard coal, brown coal, tar sands, oil shale or bitumen-containing materials.

4. Process of claim 1 wherein the dust-containing high-boiling hydrocarbons are mixed in a first separation stage with a diluent which contains high-boiling hydrocarbons, the high-solids phase separated therefrom is mixed once more with diluent in at least one subsequent separating stage, and the phase which is substantially free from solids includes said diluent and is fed to the preceding separation stage.

5. Process of claim 4 wherein diluent distilled from the phase that is substantially free from solids is fed to the last separation stage.

6. Process of claim 1 wherein the high-solids phase is separated in at least one of the separation stages by sedimentation, centrifuging or filtering from the phase which is substantially free from solids.

7. Process of claim 1 wherein the high-solids phase from the last separation stage is dried, the escaping vapors are condensed, and the condensate is recycled to the last separation stage.

8. Process of claim 1 wherein the solids-containing, high-boiling hydrocarbons have a solids content of about 5–70% by weight.

* * * * *

UNITED STATES PATENT AND TRADEMARK OFFICE
CERTIFICATE OF CORRECTION

PATENT NO. : 4,040,958
DATED : August 9, 1977
INVENTOR(S) : Roland Rammler

It is certified that error appears in the above-identified patent and that said Letters Patent are hereby corrected as shown below:

Column 5, line 16, delete "(a)" and substitute

--(b)--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*